US012744953B2

(12) United States Patent
Paliwal et al.

(10) Patent No.: US 12,744,953 B2
(45) **Date of Patent: *Sep. 22, 2026**

(54) MACHINE LEARNING FOR ADAPTIVE BITRATE SELECTION

(71) Applicant: ROKU, INC., San Jose, CA (US)

(72) Inventors: Amit Paliwal, Fremont, CA (US); Andrey Marsavin, San Jose, CA (US); Govind Vaidya, San Ramon, CA (US); Wim Michiels, San Jose, CA (US); Beth Teresa Logan, Cambridge, MA (US); Zheng Han, Jersey City, NJ (US); Tapan Oza, Round Rock, TX (US); Vijay Anand Raghavan, Newton, MA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,109

(22) Filed: Oct. 4, 2024

(65) Prior Publication Data

US 2025/0030907 A1 Jan. 23, 2025

Related U.S. Application Data

(63) Continuation of application No. 18/462,635, filed on Sep. 7, 2023, now Pat. No. 12,137,265, which is a (Continued)

(51) Int. Cl.
*H04N 21/2662* (2011.01)
*G06N 5/01* (2023.01)

(Continued)

(52) U.S. Cl.
CPC .......... *H04N 21/2662* (2013.01); *G06N 5/01* (2023.01); *G06N 20/00* (2019.01); *G06N 20/20* (2019.01);

(Continued)

(58) Field of Classification Search
CPC .......... G06N 5/01; G06N 20/00; G06N 20/20; H04N 21/2401; H04N 21/251;

(Continued)

(56) References Cited

U.S. PATENT DOCUMENTS

| | | | |
|---|---|---|---|
| 7,895,629 | B1 | 2/2011 | Shen et al. |
| 11,800,167 | B2 | 10/2023 | Paliwal et al. |

(Continued)

OTHER PUBLICATIONS

Vasilev, V. et al., "Predicting QoE Factors with Machine Learning," In 2018 IEEE International Conference on Communications (ICC), May 2018, 6 pages, downloaded on Jul. 12, 2023.

*Primary Examiner* — Thomas J Dailey

(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for modifying one or more parameters of a data streaming bitrate selection algorithm based on machine learning. An example embodiment operates by training and operating a first machine learning model to predict a sustainable network bandwidth. A second machine learning model is trained to receive the sustainable network bandwidth and predict a likelihood that this network bandwidth will not empty a data buffer of streaming data. A bitrate is selected based on the likelihood being below a threshold percentage, such as 50%.

20 Claims, 10 Drawing Sheets

Related U.S. Application Data continuation of application No. 17/515,225, filed on Oct. 29, 2021, now Pat. No. 11,800,167.

(51) Int. Cl.

| | |
|---|---|
| ***G06N 20/00*** | (2019.01) |
| ***G06N 20/20*** | (2019.01) |
| ***H04N 21/24*** | (2011.01) |
| ***H04N 21/25*** | (2011.01) |
| ***H04N 21/44*** | (2011.01) |
| ***H04N 21/442*** | (2011.01) |
| ***H04N 21/845*** | (2011.01) |

(52) U.S. Cl.

CPC ....... *H04N 21/2401* (2013.01); *H04N 21/251* (2013.01); *H04N 21/44004* (2013.01); *H04N 21/44209* (2013.01); *H04N 21/8456* (2013.01)

(58) Field of Classification Search

CPC ......... H04N 21/2662; H04N 21/44004; H04N 21/44209; H04N 21/8456

See application file for complete search history.

(56) References Cited

U.S. PATENT DOCUMENTS

| | | | |
|---|---|---|---|
| 2015/0332145 | A1 | 11/2015 | Vasseur et al. |
| 2016/0234078 | A1 | 8/2016 | Jana et al. |
| 2018/0137412 | A1 | 5/2018 | Nikkha et al. |
| 2018/0241836 | A1 | 8/2018 | Arsenault et al. |
| 2021/0185377 | A1 | 6/2021 | Sen et al. |
| 2022/0141513 | A1 | 5/2022 | Dai et al. |
| 2023/0133880 | A1 | 5/2023 | Paliwal et al. |
| 2023/0421831 | A1 | 12/2023 | Paliwal et al. |

MACHINE LEARNING FOR ADAPTIVE BITRATE SELECTION

CROSS-REFERENCE TO RELATED APPLICATIONS

This application is a continuation of U.S. patent application Ser. No. 18/462,635, filed Sep. 7, 2023, now allowed, which is a continuation of U.S. patent application Ser. No. 17/515,225, filed on Oct. 29, 2021, now U.S. Pat. No. 11,800,167, the contents of which are incorporated herein by reference in their entirety.

BACKGROUND

Field

This disclosure is generally directed to display screen technology, and more particularly to bitrate selection for data streaming.

Background

Streaming may be performed at varying levels of quality and associated download bitrates. An optimal bitrate selection may be driven by many streaming parameters, such as, available bitrates, encoding techniques, current buffer level, network connection type (wired, WiFi, mobile), WiFi performance, processor performance, etc. It can therefore be very complicated to create a single solution to handle a plurality of parameters and find an optimum set of weighted combinations to select a bitrate for data downloads.

SUMMARY

Provided herein are system, apparatus, article of manufacture, method and/or computer program product embodiments, and/or combinations and sub-combinations thereof, for modifying one or more parameters of a data streaming bitrate selection algorithm based on machine learning. The technology as described herein, in some embodiments, may be configured to improve bitrate prediction and subsequent selection. In some embodiments, the technology may be applied broadly to any configurable aspect of streaming video and/or audio.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for predicting a bitrate selection for streaming based on machine learning.

In some embodiments, the technology described herein may implement an adaptive bitrate selection with a machine learning speed model. For example, the machine learning speed model, based on supervised training using logs of current known selection algorithms, may predict a future download speed based on a random forest decision tree based classifier to predict a bitrate for streaming. Random forest is an ensemble learning method for classification, regression and other tasks that operate by constructing a multitude of decision trees at training time. For classification tasks, the output of the random forest is the class selected by most trees. For regression tasks, the mean or average prediction of the individual trees is returned. Random decision forests may correct for decision trees' habit of overfitting to their training set.

In some embodiments, the technology described herein may implement the adaptive bitrate selection with a machine learning rebuffer model. For example, the machine learning rebuffer model, based on supervised training, may determine a future download speed based on a forest decision tree based classifier that predicts if a rebuffer (i.e., empty buffer) will occur given the selected bitrate for streaming and current playback rate (consumption speed). An empty buffer may result in degraded streaming experience by pausing streaming and entering a buffering phase to accumulate enough data such that streaming can continue.

In some embodiments, the technology described herein may implement the adaptive bitrate selection with a hybrid system including a machine learning speed model and a machine learning rebuffer model. For example, the speed model, based on supervised training, may predict a future download speed (bitrate). This bitrate may be fed to the rebuffer model as a candidate bitrate to further predict if a rebuffer (i.e., empty buffer) will occur given the candidate bitrate. Throughout the descriptions, the terms speed, bitrate and bandwidth may be used interchangeably.

Figure 1:
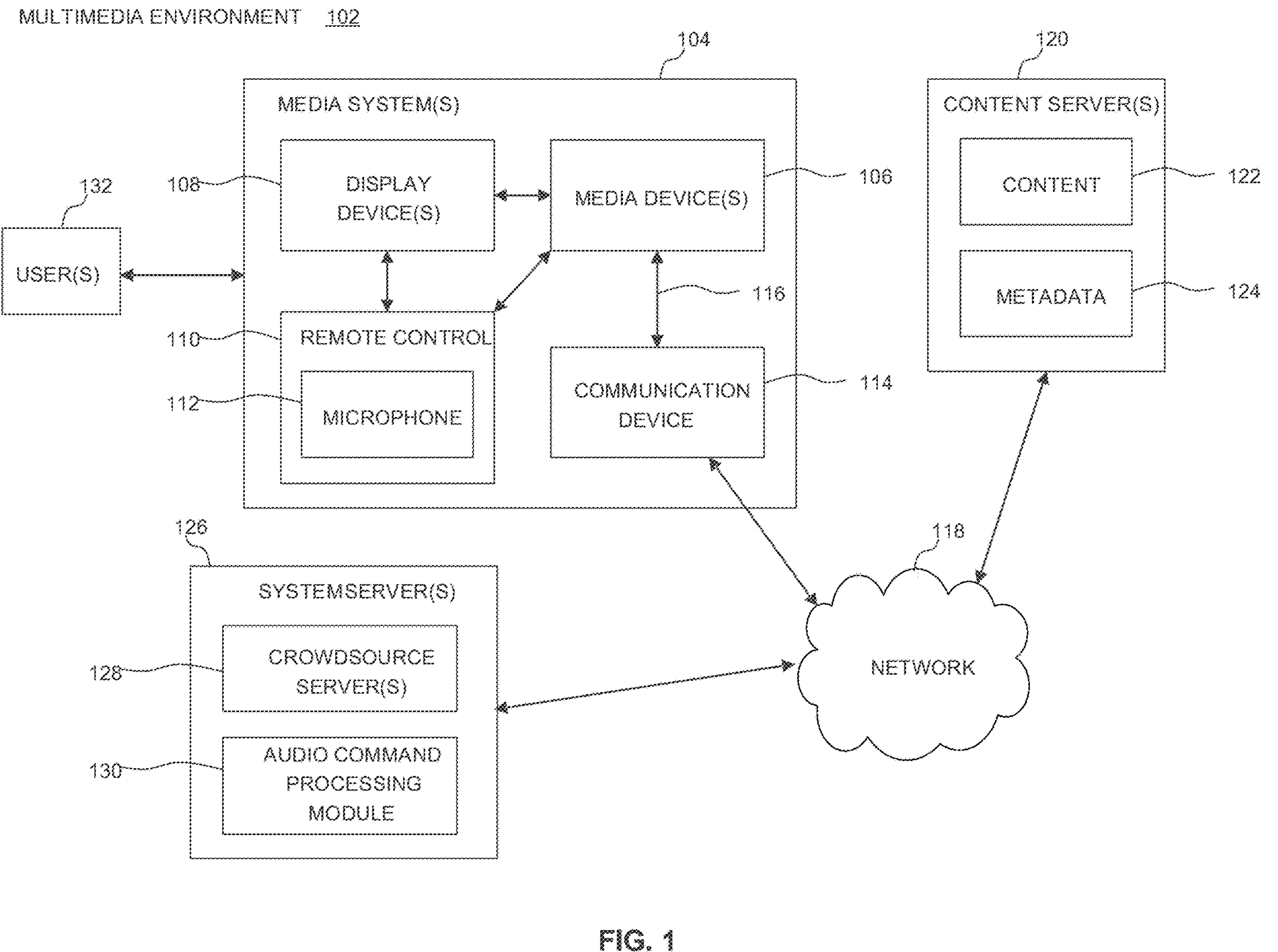
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming's of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
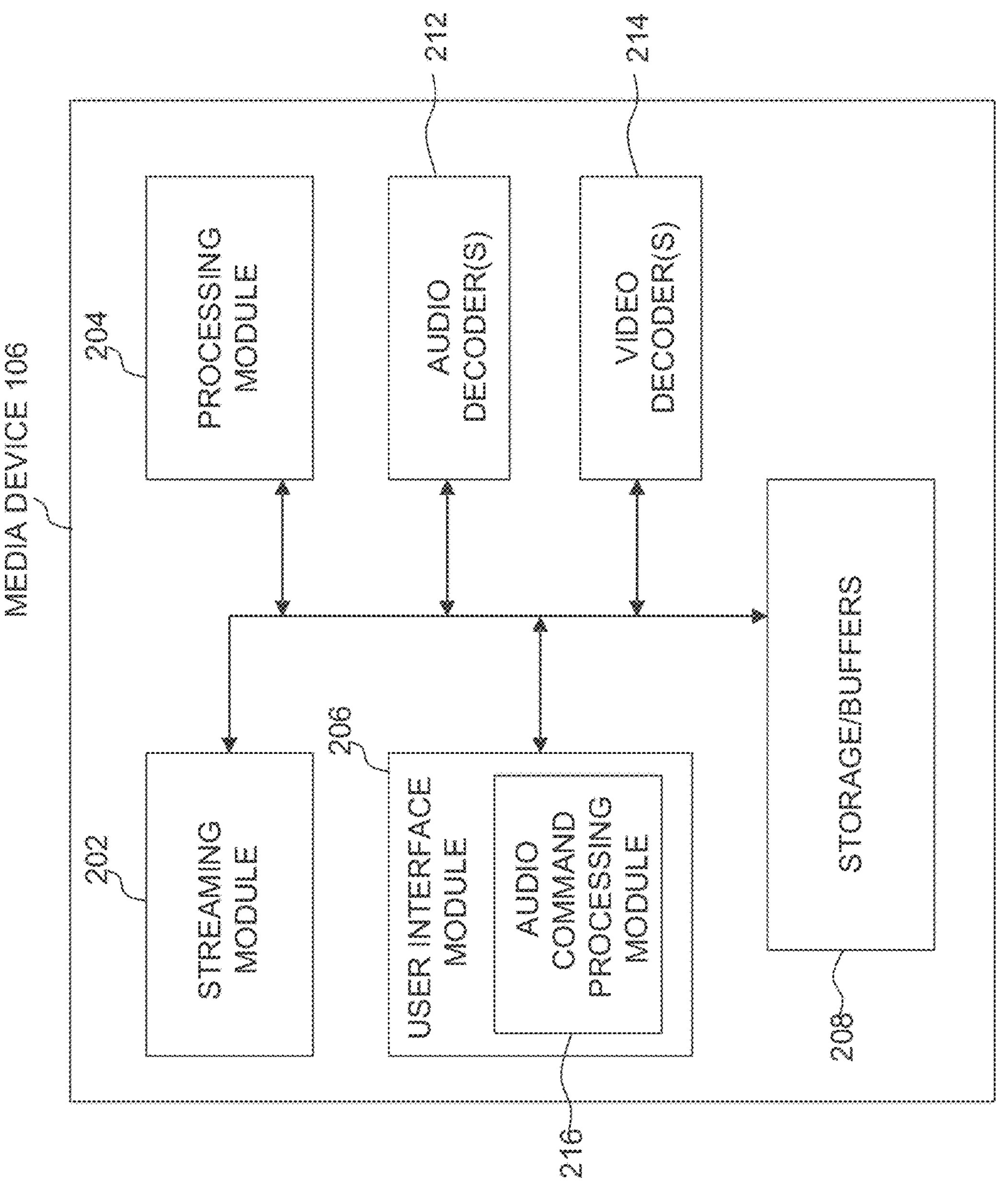
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Streaming Bitrate Modification

The technology as described herein, in some embodiments, may be configured to improve a bitrate selection for streaming video and/or audio based on one or more machine learning models. In these embodiments, the technology may be applied broadly to any configurable aspect of an adaptive bitrate selection process.

Adaptive bitrate streaming (ABR or ABS) is a technique used in streaming multimedia over computer networks. Adaptive streaming technologies are currently based on, but not limited to, Hypertext Transfer Protocol (HTTP). HTTP is an application layer protocol in the Internet protocol suite model for distributed, collaborative, hypermedia information systems. HTTP is currently the foundation of data communication for the World Wide Web, where hypertext documents include hyperlinks to other resources that the user can access, for example by a mouse click or by tapping the screen in a web browser.

More specifically, adaptive bitrate streaming is a method of streaming over HTTP where the source content is encoded at multiple bitrates. Each of the different bitrate streams are segmented into small multi-second parts (chunks). The segment size may vary depending on the particular implementation, but they are commonly between two and ten seconds. In one non-limiting example, during stream start-up, the client may request the segments from a lowest bitrate stream. If the client finds that the network throughput is greater than the bitrate of the downloaded segment, then it may request a higher bitrate segment. Later, if the client finds that the network throughput has deteriorated, it may request a lower bitrate segment.

An adaptive bitrate model in the client (e.g., media device 106) may, in some embodiments, perform the function of deciding which bitrate segments to download, based on the various parameters, such as, but not limited to, current buffer level, current and past network speeds, history of rebuffers, time of day, region of client, content delivery network (CDN), network connection type (wired, WiFi, mobile), client hardware platform, WiFi performance, central processing unit (CPU) performance, decryption performance, content encoding/decoding, packaging, etc.

Referring to FIG. 2, streaming module 202 may be configured with adaptive bitrate processing elements. In one non-limiting example, streaming module 202 is configured with a processor, a System On a Chip (SOC), video card, gaming processor, etc., as is known. While a processor is described herein as part of streaming module 202, one or more processing steps may be performed external to the streaming module 202. In one non-limiting example, processing may be performed by television circuitry, a media device 106, a content server 120, a system server 126, a video card, a gaming processor card, ancillary computing devices of user 132 or a combination of any of these processing elements.

Figure 3:
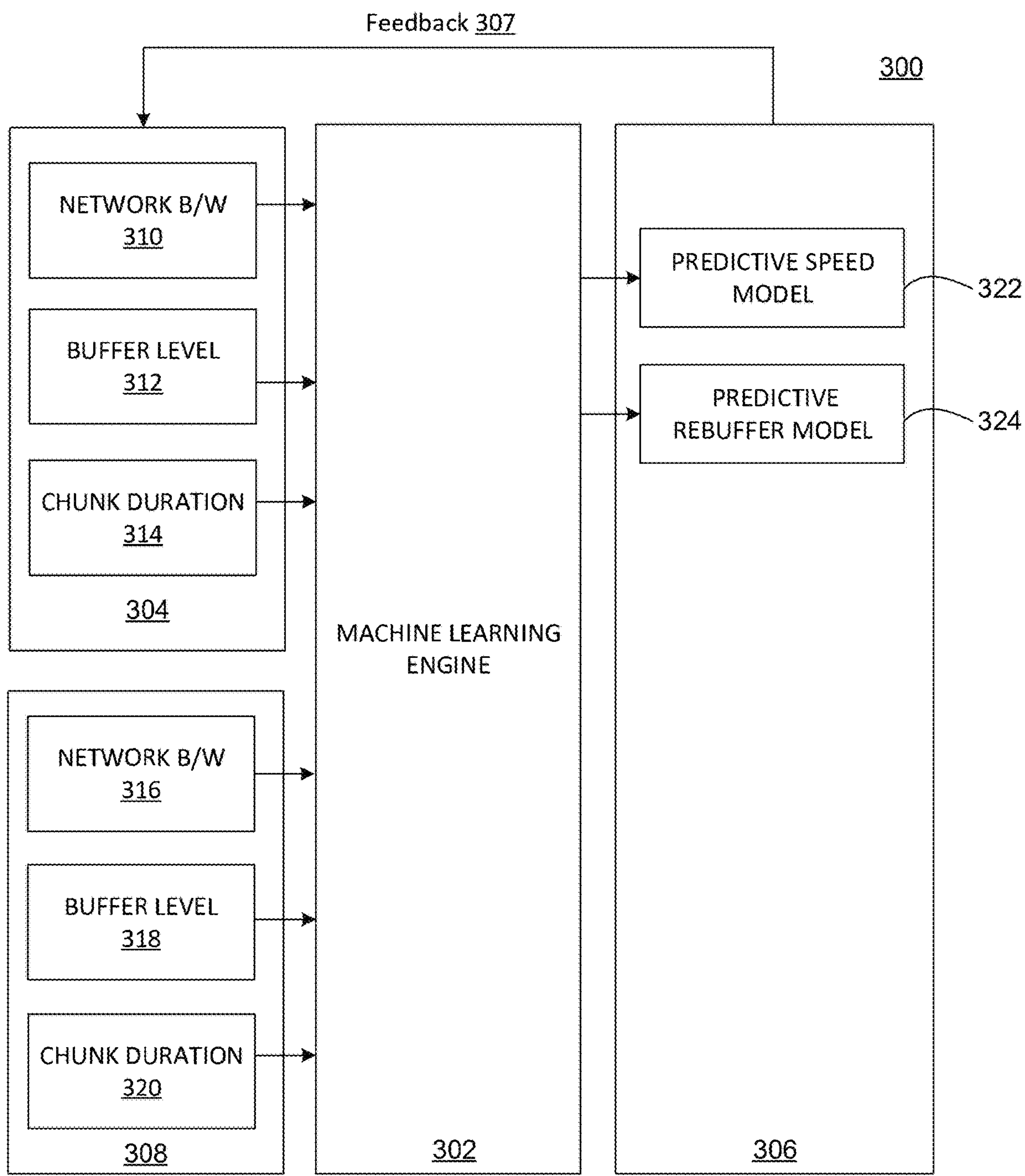
FIG. 3 illustrates a block diagram of a machine learning adaptive bitrate selection, according to some embodiments.

FIG. 3 is a block diagram of a machine learning system, according to some embodiments. A machine learning system 300 may include a machine learning engine 302, of one or more servers (cloud or local), processing streaming parameters, such as, but not limited to, current buffer level, current and past network speed history, current and past rebuffer history, time of day, region of client, content delivery network (CDN), network connection type (wired, WiFi, mobile), client hardware platform, WiFi performance, central processing unit (CPU) performance, decryption performance, content encoding/decoding, packaging, etc. The machine learning engine 302 processes the various streaming parameters to recognize relationships of these parameters as they relate to bitrate speeds. As described in various embodiments, machine learning engine 302 may be used to predict bitrate speeds and instances of rebuffering. While described in stages, the sequence may include more or less stages or be performed in a different order.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input.

Unsupervised learning can be a goal in itself (discovering hidden patterns in data) or a means towards an end (feature learning). Machine learning engine 302 may use various classifiers to map concepts associated with a specific streaming structure to capture relationships between streaming parameters and bitrate selection and/or buffering. The classifier (discriminator) is trained to distinguish (recognize) variations. Different variations may be classified to ensure no collapse of the classifier and so that variations may be distinguished.

Machine learning may involve computers learning from data provided so that they carry out certain tasks. For more advanced tasks, it can be challenging for a human to manually create the needed algorithms. This may be especially true of teaching approaches to correctly identify bitrate speeds for streaming of video and/or audio. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of bitrate selection, a dataset of streaming parameters may be used.

In an example embodiment, training data set 304 (e.g., network bandwidth 310, buffer level 312, chunk duration 314, etc.) may be ingested to train various predictive models 306. In a first non-limiting example, a speed predictive model 322 may be trained based on machine learning engine 302 processing training data set 304 to predict a next streaming bitrate. Training a model means learning (determining) values for weights as well as inherent bias from any labeled examples. In supervised learning, a machine learning algorithm builds a model by examining many examples and attempting to find a model that minimizes loss; this process is called empirical risk minimization. A speed predictive model 322, hereafter speed model, predicts (regresses) a next download (network) speed for a next chunk.

In another example embodiment, a rebuffer predictive model 324 may be trained based on machine learning engine 302 processing training data set 304 to predict a potential rebuffer instance. Training a model means learning (determining) values for weights as well as inherent bias from any labeled examples. A rebuffer model 324 assigns a probability of a selected bitrate emptying the buffer.

In some embodiments, the training cycle continuously looks at bitrate prediction or rebuffer prediction results and provides a feedback loop 307 to improve capabilities of the various predictive models 306. Feedback refers to the process by which a machine model's predicted outputs are reused to train new versions of the model (322 or 324).

In addition, as various predictive models (algorithms) 306 are created, they are stored in a database (not shown). For example, as the training sets are processed through the machine learning engine 302, the speed predictive model 322 may change (tuning/fine tuning) and therefore may be recorded in the database.

Future new data 308 (e.g., network bandwidth 316, buffer level 318, chunk duration 320, etc.) may be subsequently evaluated with the trained predictive models 306. While network bandwidth, buffer level and chunk duration have been included as input parameters in one or more example embodiments, any known or future streaming parameter may be substituted without departing from the scope of the technology described herein.

Alternately, or in addition to, geo location of a streaming device may be used to train the machine learning models to learn characteristics of a device's location, such as a region. Alternately, the geo location may be implemented using clustering, based on geo locations, and then applying the machine learning models to each cluster.

Alternately, or in addition to, one or more of the training features or future features may be sampled at different frequencies to balance an outsized affect one feature data set may have on a machine learning model's output. In a non-limiting example, when implementing the rebuffer model, far more occurrences of a no-rebuffer prediction would be expected than for a rebuffer prediction. To reduce this high imbalance in predictions, a smaller sample size of previous no-rebuffers may be implemented for the training datasets to allow the rebuffer model to extract additional information and therefore balance the rebuffer model.

In some embodiments, the technology described herein may implement machine learning model training based on a specific streaming platform or streaming device. For example, different products may have different hardware capabilities such as Wi/Fi, chips, drives, CPU performance, etc. All of these factors may influence speed selections. Therefore, the platform and/or streaming device may train and deploy the machine learning models per platform or per device. The ML system may collect the specifics for each platform or device, or may cluster based on hardware capabilities, and then apply the machine learning models.

In some embodiments, the technology described herein may implement machine learning model training based on a local hour. For example, streaming statistics may vary during different hours of the day. In some embodiments, each local hour may be an input feature to the ML models or the system may cluster 24 hours into peak hours (e.g., 6 PM-9 PM), no peak hours, etc.

Figure 4:
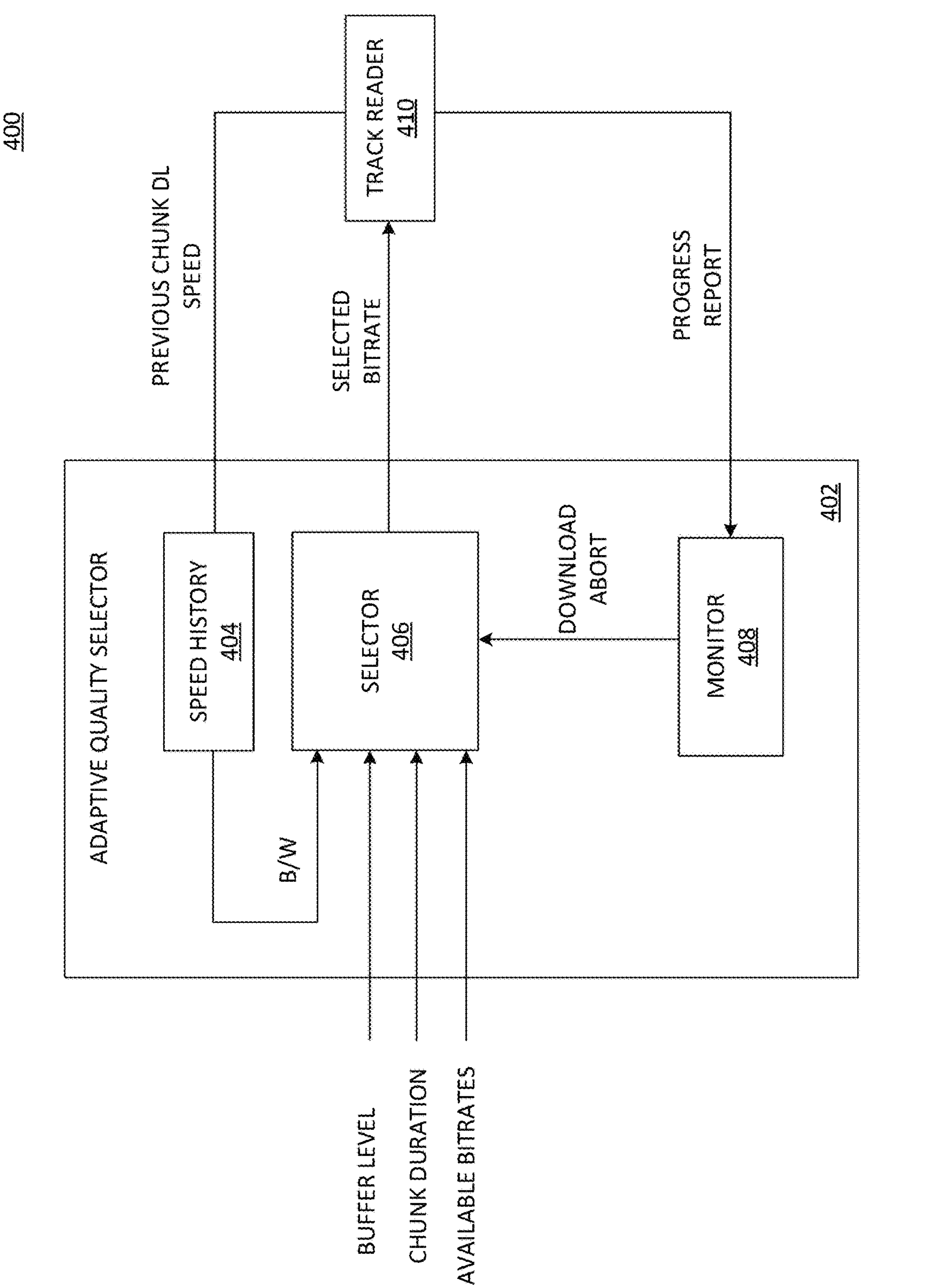
FIG. 4 illustrates a block diagram of an adaptive bitrate selection, according to some embodiments.

FIG. 4 illustrates a block diagram of a bitrate selection system 400, according to some embodiments. Bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps described may be performed simultaneously, or in a different order than described for FIG. 4, as will be understood by a person of ordinary skill in the art.

Figure 9:
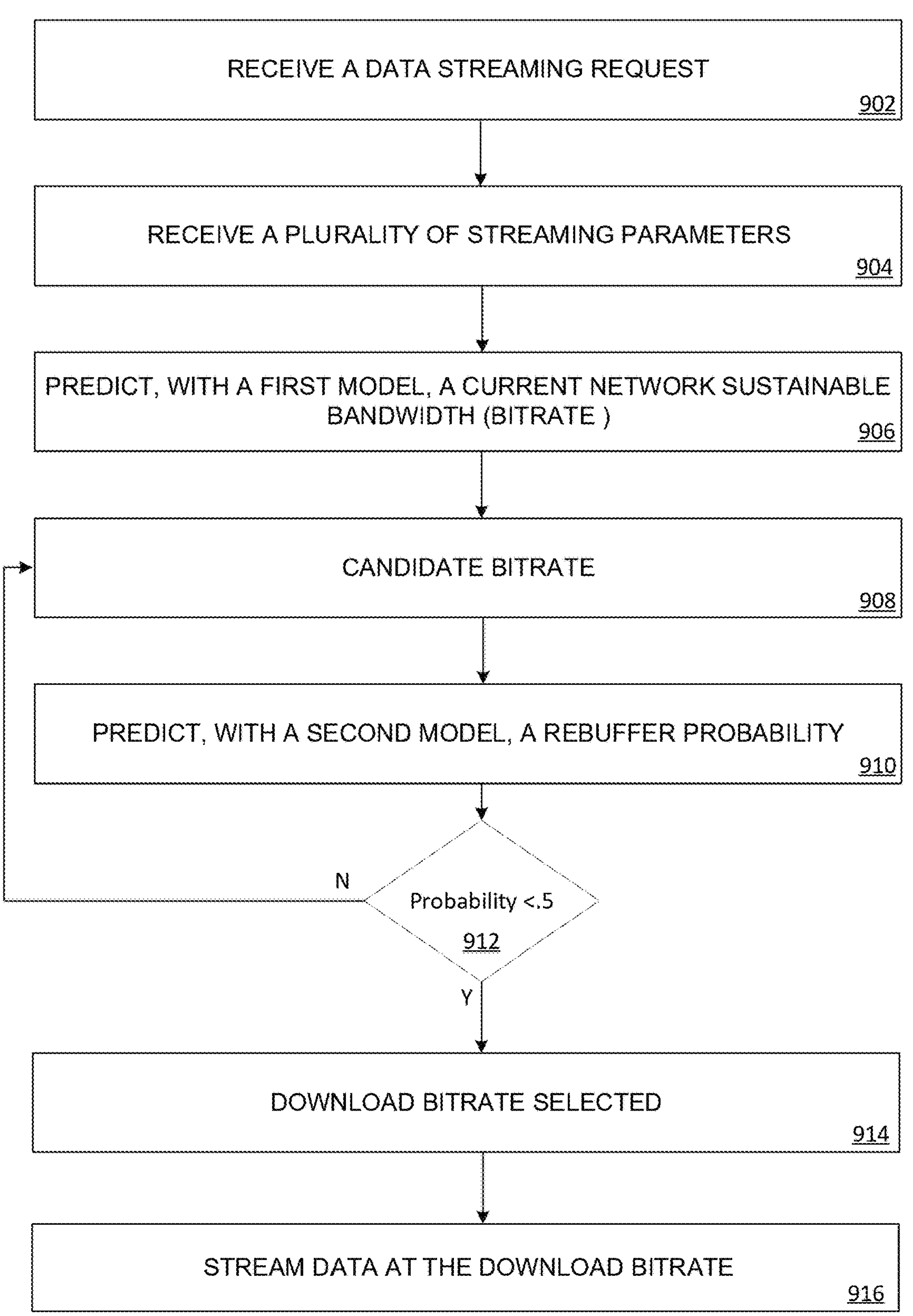
FIG. 9 illustrates a process diagram of a hybrid adaptive bitrate selection, according to some embodiments.

In various embodiments, the technology described in FIG. 4 may implement an adaptive bitrate selection with a machine learning speed model (FIG. 5), a machine learning rebuffer model (FIG. 7) or a hybrid arrangement with an interconnected machine learning speed model and a machine learning rebuffer model (FIG. 9).

In one non-limiting example, the machine learning speed model, based on supervised training using logs of current known selection algorithms, may predict a future download speed based on a random forest decision tree based classifier to predict a sustainable bitrate for streaming (bandwidth).

In another non-limiting example, the machine learning rebuffer model, based on supervised training, may determine a future download bitrate based on a forest decision tree based classifier that predicts if a rebuffer (i.e., empty buffer) will occur given a candidate bitrate for streaming and current playback rate. An empty buffer may result in degraded streaming by entering a buffering phase in an effort to accumulate enough data to restart streaming.

In another non-limiting example, the technology described herein may implement the adaptive bitrate selection with a hybrid system including a machine learning speed model and a machine learning rebuffer model. For example, the speed model, based on supervised training, may predict a future download speed (bitrate). This bitrate candidate may then be fed to the rebuffer model to further predict if a rebuffer (i.e., empty buffer) will occur given the selected bitrate.

As shown, an adaptive bitrate selector 402 may be configured with three major modules: speed history module 404, selector module 406 and monitor module 408. Each of these modules may be implemented by processing logic that can comprise hardware (e.g., circuitry, dedicated logic, programmable logic, microcode, etc.), software (e.g., instructions executing on a processing device), or a combination thereof. The speed history module 404 will be described in greater detail for FIG. 5 as it pertains to a machine learning implementation. The selector module 406 will be described in greater detail for FIG. 7 as it pertains to a machine learning implementation. A hybrid machine learning embodiment, adaptive bitrate selector 402 configured with a machine learning implementation of speed history module 404 and a machine learning implementation of selector 406, will be described in greater detail for FIG. 9.

The speed history module 404 retains a history of previous download speeds (bitrates) and outputs a current sustainable network bandwidth that selector module 406 may reliably operate with. For example, a current network bandwidth may reflect a sustainable video speed at a known quality. Knowing the current sustainable download speed of a segment (chunk), the selector 406 is configured to predict future bitrates in a sequence of bitrates. Bandwidth may refer to the rate of data transfer, bitrate or data throughput.

The download history of chunks may be an indicator for the machine learning models to predict the next download speed. In a non-limiting embodiment, a number of past chunks may be chosen and then smoothing applied by calculating a moving average and standard deviation. This process may remove unnecessary variations. For example, taking too many chunks or too few chunks may not be optimal and negatively affect the prediction of the model. As a result, the following features may be considered when selecting a chunk:

lag_1—previous chunk's speed;
lag_2—speed from 2 chunks ago;
lag_3—speed from 3 chunks ago;
lag_4—speed from 4 chunks ago;
lag_5—speed from 5 chunks ago;
mavg—moving average of speeds from at most 5 previous chunks, or
std—standard deviation of speeds from at most 5 previous chunks.

However, when a training session begins, the system may not have values for lag_2-5 resulting in null values in training data and incorrect results. In some embodiments, the system may duplicate the values, for example, if lag_1 is present but lag_2-5 are not present, then the system replaces lag_2-5 with the value of lag_1. Alternately, null values may be replaced with the moving average.

The selector module 406 generates, based on a bitrate selection system (e.g., FIG. 7), decisions to select what bitrate to choose for the next downloading segment (chunk) on a segment boundary (each chunk will have a beginning and end boundary). Inputs to selector module 406 include in an exemplary embodiment bandwidth (B/W) as derived from speed history module 404, buffer level, chunk duration and available bitrates. In one embodiment, an encoder (not shown) encodes a single source media (video or audio) at multiple bitrates. The encoding function may be performed at a content provider or server-side content distribution system. These multiple bitrates represent different speed/quality available bitrates for selection by the selector module 406. The selector module switches between streaming the different encodings depending on available resources. In some embodiments, the single source media may be pre-encoded at differing rates or alternately, or in addition to, may be encoded on-the-fly.

The responsibility of the monitor module 408 is to interrupt the currently downloading segment if the network condition (current sustainable bandwidth) has abruptly deteriorated. Network conditions may change based on network congestion, poor communication signals, equipment failures, etc.

In the exemplary embodiment, current sustainable bandwidth, buffer level, chunk duration and available bitrates may be selected as input parameters to the adaptive bitrate selector 402. However, one skilled in the art will appreciate that any streaming parameter (e.g., current buffer level, current and past network speed history, current and past rebuffer history, time of day, region of client, content delivery network (CDN), network connection type (wired, WiFi, mobile), client hardware platform, WiFi performance, central processing unit (CPU) performance, decryption performance, content encoding/decoding, packaging, etc.) may be substituted as inputs to the selector module 406 without departing from the scope of the present technology.

Output from the selector module 406 is a selected speed (bitrate) to stream future data chunks. For example, for high definition (HD 1080) streaming, a bitrate of approximately 8,000 kbps may be used for future segment (chunk) downloads.

Track reader module 410 tracks the current downloading speed of a current downloading segment and provides the chunk to the speed history module 404 where it is accumulated (stored in computer memory) as an historical record of previous bitrate selections. Track reader module 410 also feeds this bitrate as a progress report to the monitor module 408 to interrupt (abort) the currently downloading segment if the network condition (bandwidth) has abruptly deteriorated.

In the various embodiments described hereafter, a machine learning (ML) speed model may implement the speed history and/or the selector to achieve the same or better performance. The ML models may be trained offline in supervised fashion using data download logs. These models may be fed a number of input parameters. In some embodiments, the ML models may be deployed on a client device, such as a media devices 106 or display devices 108 (e.g., televisions), or in the cloud.

Figure 5:
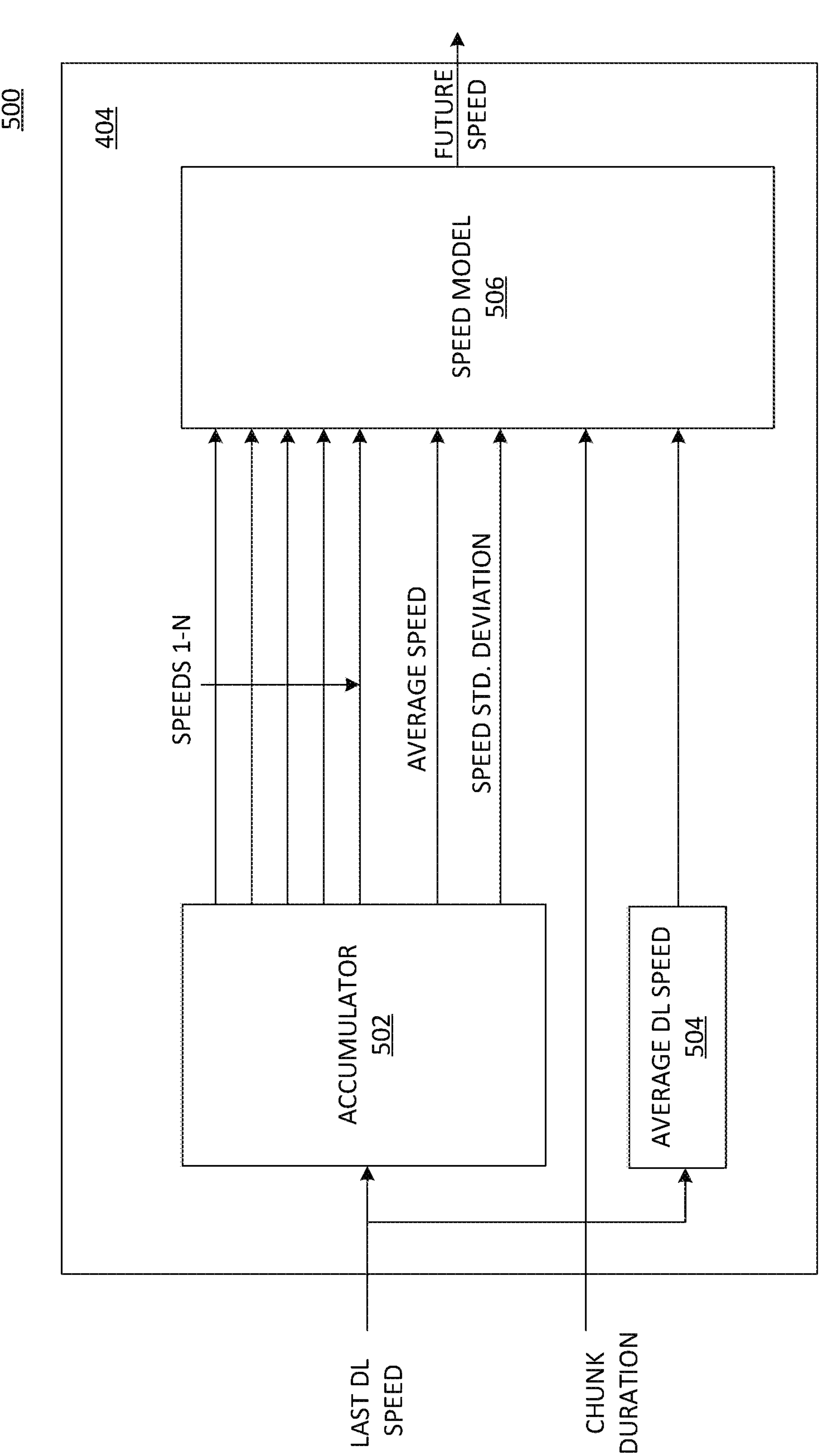
FIG. 5 illustrates a block diagram of a machine learning adaptive bitrate selection, according to some embodiments.

FIG. 5 illustrates a block diagram of the machine learning speed model system 500. Bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 5, as will be understood by a person of ordinary skill in the art.

In some embodiments, speed history module 404 may be configured with a machine learning system speed predictive model 506 (same as speed predictive model 322 in FIG. 3), hereafter speed model. The speed model 506 is generated by machine learning algorithms based on sample data, known as "training data", in order to make predictions or decisions without being explicitly programmed to do so. In some embodiments, the speed model is a forest (random forest) decision tree based regressor. As previously described, random forests are an ensemble learning method for classification and regression that operate by constructing a multitude of decision trees at training time. For classification tasks, the output of the random forest is the class selected by most trees. For regression tasks, the mean or average prediction of the individual trees is returned. Regression analysis is a set of statistical processes for estimating the relationships between a dependent variable (often called the 'outcome' or 'response' variable) and one or more independent variables (often called 'predictors', 'covariates', 'explanatory variables' or 'features'). Regression analysis may be used for prediction or forecasting of the bitrate.

Accumulator 502 stores previous download speeds and provides N discrete previous speeds to the speed model for consideration. Alternately, or in addition to, the accumulator provides an average speed of N previous speeds. Alternately, or in addition to, the accumulator provides a speed deviation for the N previous speeds. Chunk duration (e.g., from manifest data) for a next chunk is also provided as an input to the speed model. Average downloading speed module 504 provides a current stable network bandwidth (B/W) to the speed model 506. The network bandwidth and chunk duration may be subsequently evaluated with the trained predictive speed model 506 to predict a future speed (bitrate). Previous speeds, average speed, speed standard deviation, network bandwidth and chunk duration have been included as input parameters in this example embodiment. However, any known or future streaming parameter may be substituted without departing from the scope of the technology described herein.

Figure 6:
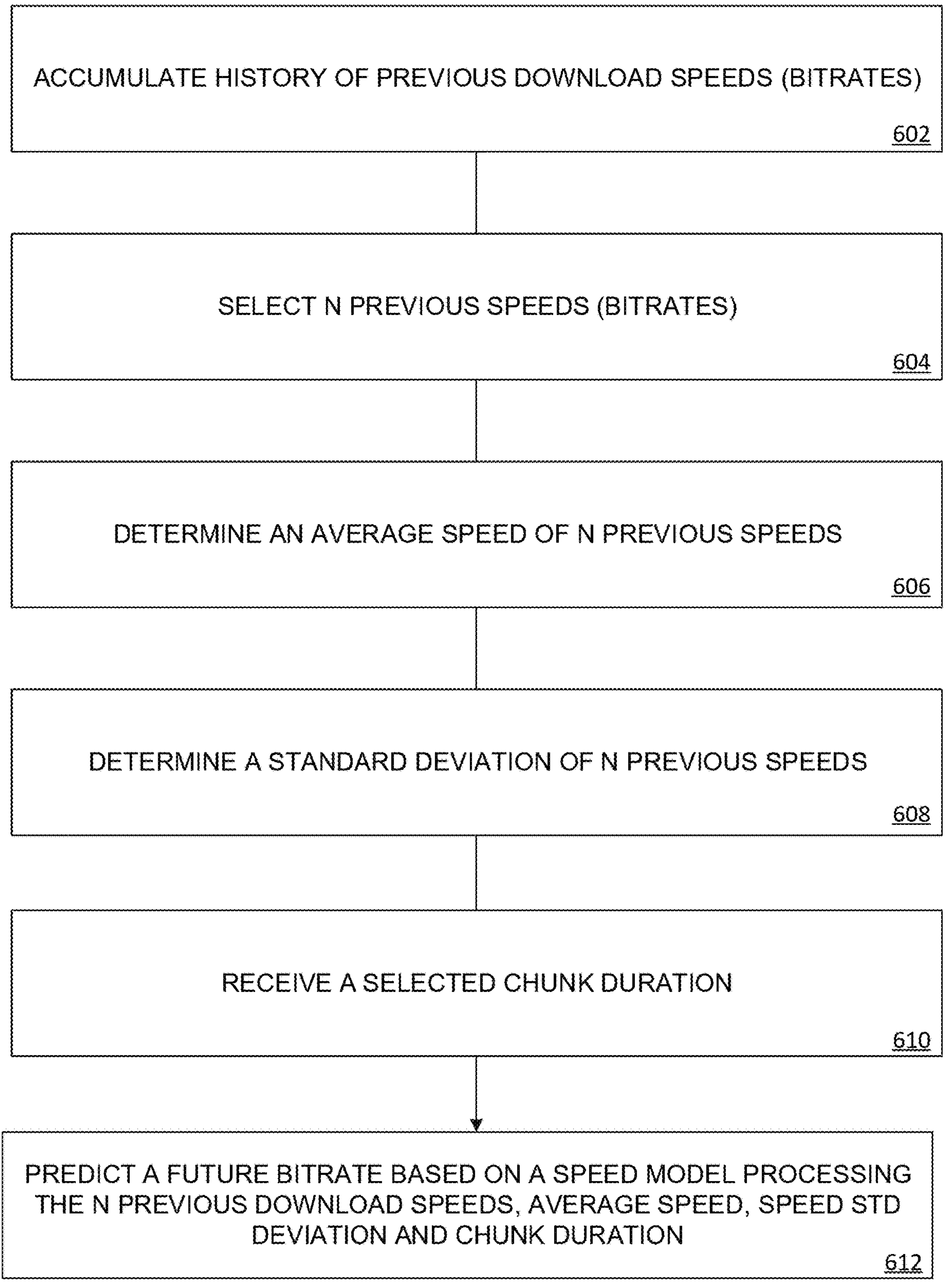
FIG. 6 illustrates a process diagram of an adaptive bitrate selection, according to some embodiments.

FIG. 6 illustrates a flow diagram of a bitrate selection, according to some embodiments. Bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 6, as will be understood by a person of ordinary skill in the art.

In 602, the accumulator 502 aggregates a series of previous download speeds (bitrates) to build a history of bitrate selections in a sequence of bitrate selections. For example, as previously described in FIG. 4, track reader 410 feeds bitrates (last download speed) back to the speed history module 404 as previous chunk download speeds. This last download speed is stored in computer memory of accumulator 502 as it changes.

In 604, the accumulator selects and outputs N previous (most recent) speeds (bitrates) to machine learning speed model 506. For example, based on previous training sequences and a sequence of N most recent bitrates, the speed model may predict a future bitrate (speed).

In 606, the accumulator selects and outputs an average of the N previous speeds to machine learning speed model 506. For example, based on previous training sequences, the sequence of N previous bitrates and the average of the N speeds, the speed model will predict a future bitrate (speed).

In 608, the accumulator selects and outputs a standard deviation of the N previous speeds to machine learning speed model 506. For example, based on previous training sequences, the sequence of N previous bitrates, the average of the N speeds and the standard deviation of the N previous speeds, the speed model will predict a future bitrate (speed).

In 610, the machine learning speed model 506 receives a chunk duration. For example, each of the different bitrate streams are segmented into small multi-second parts (chunks). The segment size may vary depending on the particular implementation, but they are commonly between two and ten seconds and may be the same for all bitrate selections.

In 612, based on previous training sequences, the sequence of N previous bitrates, the average of the N speeds, the standard deviation of the N previous speeds and the chunk duration, the speed model will predict a future bitrate (speed).

Figure 7:
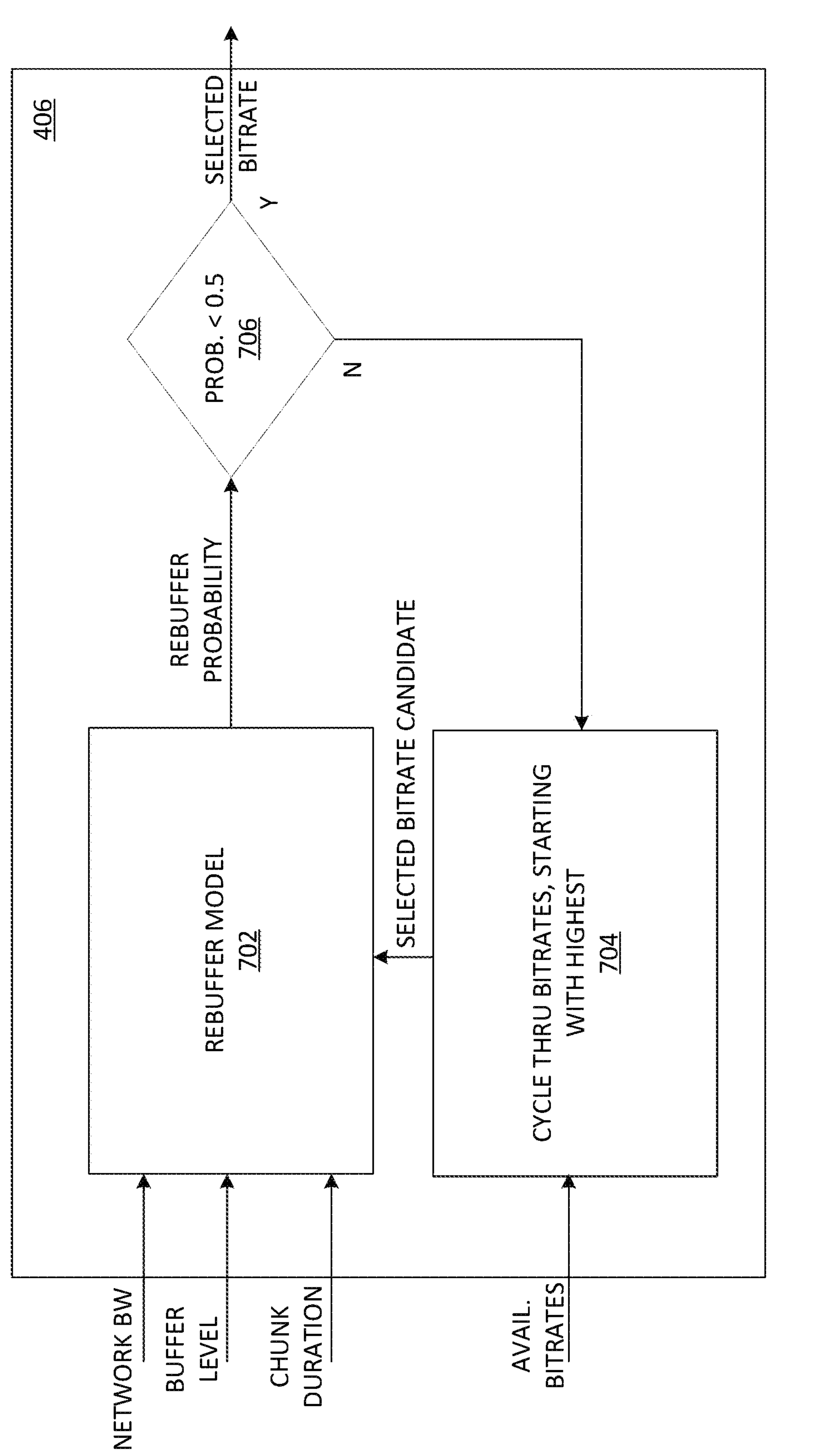
FIG. 7 illustrates a block diagram of a machine learning adaptive bitrate selection, according to some embodiments.

FIG. 7 illustrates a block diagram of a bitrate selection, according to some embodiments. Bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 7, as will be understood by a person of ordinary skill in the art.

In computing, a data buffer (buffer), for example storage/buffers 208, is a region of a physical memory storage used to temporarily store data while it is being moved from one place to another. Typically, the data is stored in a buffer as it is retrieved from a download source or just before it is sent to an output device (e.g., display devices 108). Buffers may be implemented in a fixed memory location in hardware—or by using a virtual data buffer in software, pointing at a location in the physical memory. In all cases, the data stored in a data buffer are stored on a physical storage medium. A majority of buffers are implemented in software, which typically use the faster memory (e.g., RAM) to store temporary data, due to the much faster access time compared with hard disk drives.

Buffers are commonly used when there is a difference between the rate at which data is received and the rate at which it can be processed (e.g., playback), or in the case that these rates are variable (e.g., video streaming). In a distributed computing environment, a data buffer may be implemented in the form of burst buffer that provides distributed buffering service. A buffer often adjusts timing by implementing a queue (or FIFO) algorithm in memory, simultaneously writing data into the queue at one rate and reading it at another rate.

Streaming is an alternative to file downloading, a process in which the end-user obtains the entire file for the content before watching or listening to it. Through streaming, an end-user can use their media player 106 to start playing digital video or digital audio content before the entire file has been transmitted. To provide a continuous stream, a series of frames need to be stored in the buffer such that they can be displayed continuously without emptying the buffer (rebuffer).

In some embodiments, selector module 406 may be configured with a machine learning system rebuffer predictive model 702 (same as rebuffer predictive model 324 in FIG. 3), hereafter rebuffer model. The rebuffer model 702 is generated by machine learning algorithms based on sample data, known as "training data", in order to make predictions or decisions without being explicitly programmed to do so. In some embodiments, the rebuffer model is a forest decision tree based regressor. As previously described, random forests are an ensemble learning method for classification, regression and other tasks that operate by constructing a multitude of decision trees at training time. For classification tasks, the output of the random forest is the class selected by most trees. For regression tasks, the mean or average prediction of the individual trees is returned.

Available download speeds (bitrates) are received by selector 704, are provided sequentially to the rebuffer model 702, starting with the highest (or alternatively the lowest) for consideration. In addition, the selector 406, receives a stable network bandwidth (B/W), buffer level (data buffer) and a chunk duration (as previously described). The network bandwidth, buffer level and chunk duration may be subsequently evaluated by the rebuffer model 702 to predict a rebuffer probability (probability that the buffer will be emptied during playback). If, at 706, the probability is above 50% (meaning that the buffer is likely to be emptied and interrupt streaming), the cycling through bitrates by selector 704 (i.e., select the next available bitrate) continues until reaching a probability below 50% (0.5). The bitrate at which this occurs becomes the selected bitrate. As configured, the rebuffer model 702 predicts a speed (bitrate) that would provide a continuous streaming experience by not emptying the buffer (rebuffer). Network bandwidth, buffer level, and chunk duration have been included as input parameters in this example embodiment. However, any known or future streaming parameter may be substituted without departing from the scope of the technology described herein.

While rebuffer probabilities are described as "above or below" 50% throughout the descriptions herein, the probability may be selected to be any threshold to improve or relax the process of selecting a bitrate based on rebuffer probabilities. For example, if the probability was 20%, the system would continue to cycle through additional bitrate selections until the probability of rebuffer fell below the 20%.

As described above, the model predicts whether the rebuffer will occur or not. However, the bitrate selection system selects the bitrate from an available list of network bitrates. In some embodiments, the bitrate selection system may be configured to:

1. Loop over the available bitrates from highest to lowest and pass these bitrates as an input to the rebuffer model. If the rebuffer model predicts a rebuffer, move to one lower bitrate (704) and so on. Alternately, or in addition to, the system may start with the bitrate that was last played. For example, if the recent chunk bitrate was 5 Mbps (megabits per second), and the list of available bitrates is 2 Mbps, 5 Mbps, 10 Mbps, rather than beginning with 10 Mbps, the system may begin with 5 Mbps. This may further reduce the probability of a rebuffer or an abort.
2. If the chosen bitrate is same as the one that resulted in the last rebuffer, then one lower bitrate is selected.

In some embodiments, the bitrate selection system may be configured to:

1. Validate and evaluate the machine learning models (session replay) by determining if the predicted network speed is less than an actual speed of the next three chunks. If yes, then heuristics would indicate no rebuffer. For example, if the current chunk is chunk 1, then chunk 2 and chunk 3 will be the future chunks. If the system predicts the network speed for chunk 1, and if that is less than the network speed of chunk 2 and chunk 3, then the system should not see a rebuffer. Chunk 2 and chunk 3 are available based on the whole training dataset. For example, if three rows are available, where a first row is chunk 1, then chunk 2 and so on, then in the training dataset, the system has the actual network speed for chunk 2 and chunk 3. Therefore, when the machine learning models predict the network speed for chunk 1, the system compares it with the actual speed of chunk 2 and chunk 3.

Figure 8:
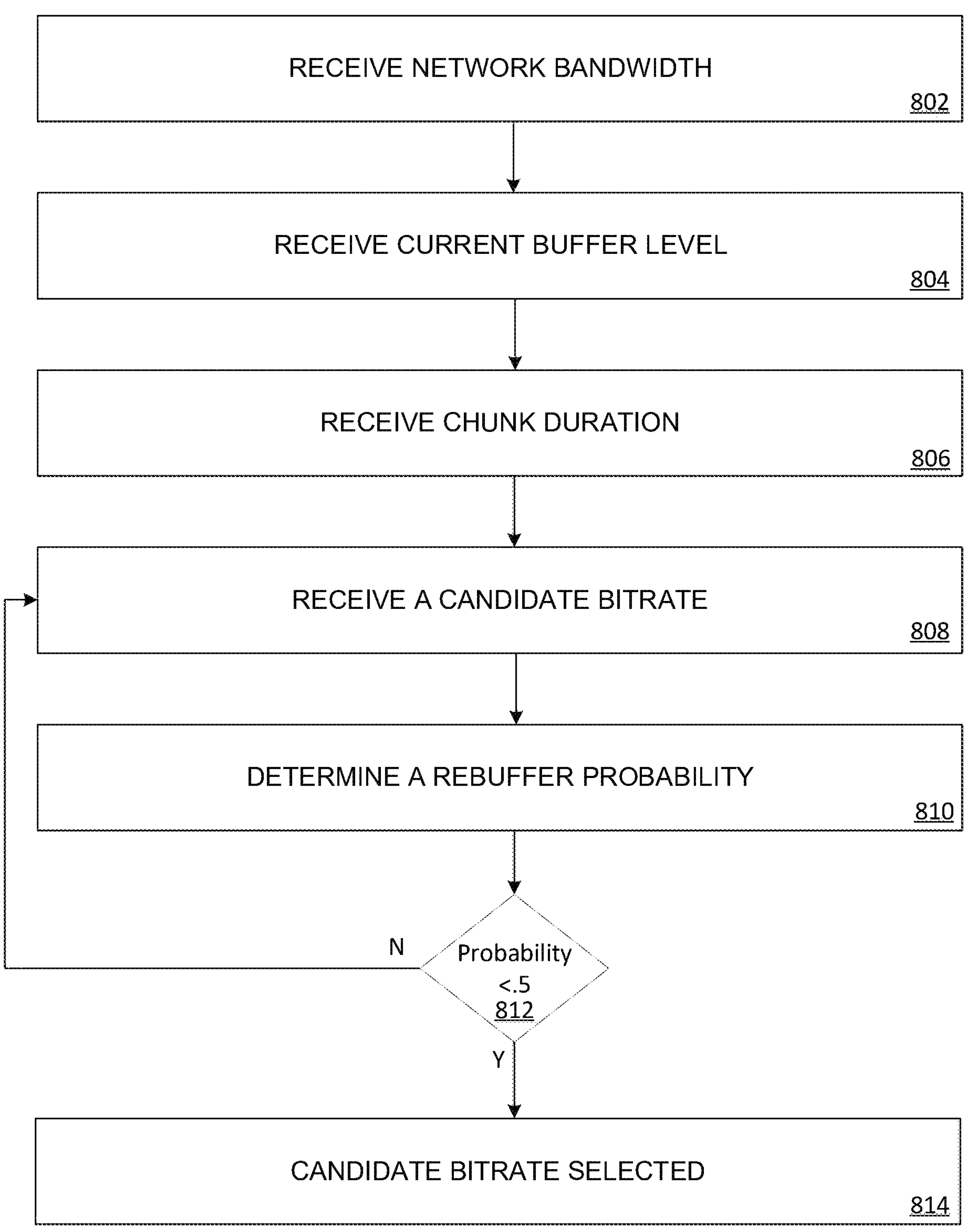
FIG. 8 illustrates a process diagram of an adaptive bitrate selection, according to some embodiments.

FIG. 8 illustrates a flow diagram of a bitrate selection, according to some embodiments. Bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 8, as will be understood by a person of ordinary skill in the art.

In 802, a rebuffer model receives network bandwidth from the speed history module 404 (FIG. 4). For example, the speed history module 404 retains a history of previous download speeds (bitrates) and outputs a sustainable network bandwidth to the rebuffer model. The network bandwidth may define an average sustainable video quality. Knowing the current sustainable download speed of a segment (chunk), the trained rebuffer model will be able to predict future speeds (bandwidth).

In 804, the rebuffer model receives a buffer level. For example, the rebuffer model receives a buffer level from the storage/buffers 208 (FIG. 2). The buffer level may provide an indication of previously downloaded data that has yet to be played back and therefore is available for display (playback). Knowing the buffer level, the trained rebuffer model will be able to predict future speeds (bandwidth) to maintain a sufficient buffer level without emptying the buffer.

In 806, the rebuffer model receives a chunk duration. For example, the rebuffer model receives a chunk duration from the streaming module 202 (FIG. 2). Each of the different bitrate streams are segmented into small multi-second parts (chunks). The segment size may vary depending on the particular implementation, but they are commonly between two and ten seconds. Knowing the buffer level and chunk duration, the trained rebuffer model will be able to predict future speeds (bandwidth) to maintain a sufficient buffer level without emptying the buffer.

In 808, the rebuffer model receives a candidate bitrate. For example, the rebuffer model receives a candidate bitrate from the streaming module 202 (FIG. 2). Knowing the buffer level, chunk duration and candidate bitrate, the trained rebuffer model will be able predict if a rebuffer will occur at the candidate bitrate.

In 810, based on the network bandwidth, buffer level, chunk duration, and candidate bitrate, the rebuffer model predicts whether a probability of a rebuffer occurring will be above or below 50% (0.5). If below 50%, the candidate bitrate becomes the selected streaming bitrate 814. However, if it appears that a rebuffer is probable (greater than 50%), the selector cycles through to a next candidate bitrate from a plurality of available bitrates. In one non-limiting example, the selector selects the next lower bitrate as the next candidate bitrate and checks this candidate bitrate for probability of rebuffer with the rebuffer model. While rebuffer probabilities are described as "above or below" 50% throughout the descriptions herein, the probability may be selected to be any threshold to improve or relax the process of selecting a bitrate based on rebuffer probabilities. For example, if the probability was 20%, the system would continue to cycle through additional bitrate selections until the probability of rebuffer fell below the 20%.

As configured, the rebuffer model predicts a speed (bitrate) that would provide a continuous streaming experience by not emptying the buffer (rebuffer). Network bandwidth, buffer level, and chunk duration have been included as input parameters in this example embodiment. However, any known or future streaming parameter may be substituted without departing from the scope of the technology described herein.

FIG. 9 illustrates a flow diagram of a hybrid bitrate selection, according to some embodiments. Bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 9, as will be understood by a person of ordinary skill in the art.

In one embodiment, a client device (e.g., media device 108) may include a hybrid bitrate selector system. In a hybrid bitrate selector system, the client device implements the adaptive bitrate selector 402 (FIG. 4) with the speed history module 404 configured with the speed model implementation of FIG. 5 and the selector 406 module configured with the rebuffer model implementation of FIG. 7. In this two-stage hybrid system, the speed model predicts a current sustainable bitrate (bandwidth) and provides this bitrate as a candidate bitrate to the rebuffer model. The rebuffer model subsequently predicts a probability of a rebuffer at the candidate bitrate based on additional streaming parameters.

In 902, a client device receives a data streaming request. For example, the request includes a request to stream data content located remote from the client device. The streaming may be performed by an adaptive bitrate system where the content is formatted as chunks at varied available bitrates.

In 904, a plurality of streaming parameters are received. For example, the client device may receive streaming parameters such as N previous download speeds (bitrates), an average of these N previous download speeds, a standard deviation of these N previous download speeds, and a chunk duration. In addition, the client device may receive a current data buffer level. For example, client device may receive a current data buffer level from the storage/buffers 208 (FIG. 2). The current data buffer level may provide an indication of previously downloaded data that has yet to be played back and therefore is available for display (playback) on display devices 108.

In 906, the speed model (first model) predicts a current sustainable network bandwidth (see FIGS. 5 and 6). For example, based the sequence of N previous download speeds (bitrates), an average of these N previous download speeds, a standard deviation of these N previous download speeds and a chunk duration, the speed model will predict a sustainable network bandwidth (bitrate).

In 908, the selector 704 selects a candidate bitrate equal to the sustainable network bandwidth (bitrate). For example, the rebuffer model receives the candidate bitrate from the speed model. Knowing the buffer level, chunk duration and candidate bitrate, the rebuffer model will be better able predict if a rebuffer will occur at the candidate bitrate.

In 910, based on the network bandwidth, buffer level, chunk duration, and candidate bitrate, the rebuffer model (second model) predicts whether a probability of rebuffering occurring will be above or below 50% (0.5). If below 50%, the candidate bitrate becomes the selected download (streaming) bitrate 914. However, if it appears that rebuffering is probable (greater than 50%), the selector 704 cycles through to a next candidate bitrate 908 from a plurality of available bitrates lower than the previous candidate bitrate. In one non-limiting example, the selector selects the next lower bitrate as the next candidate bitrate and checks this candidate bitrate for probability of rebuffering with the rebuffer model, repeating the process until a probability lower than 50% occurs.

While rebuffer probabilities are described as "above or below" 50% throughout the descriptions herein, the probability may be selected to be any threshold to improve or relax the process of selecting a bitrate based on rebuffer probabilities. For example, if the probability was 20%, the system would continue to cycle through additional bitrate selections until the probability of rebuffer fell below the 20%.

In 916, the selected bitrate 914 is used to stream (download data) to a client device, such as media devices 106. For example, for high definition (HD 1080) streaming, a bitrate of approximately 8,000 kbps may be used for future segment (chunk) downloads.

As configured, the rebuffer model predicts, based on the candidate speed (bitrate), if a continuous streaming experience will occur (i.e., no emptying of the buffer (rebuffer)). Network bandwidth, buffer level, and chunk duration have been included as input parameters in this example embodiment. However, any known or future streaming parameter may be substituted without departing from the scope of the technology described herein.

In some embodiments, the technology described herein may implement one or both of the speed model and the rebuffer model as part of firmware loaded onto a streaming device. Alternately, or in addition to, the models may be located remotely (e.g., in the cloud) and configured to connect to streaming devices.

Example Computer System

Figure 10:
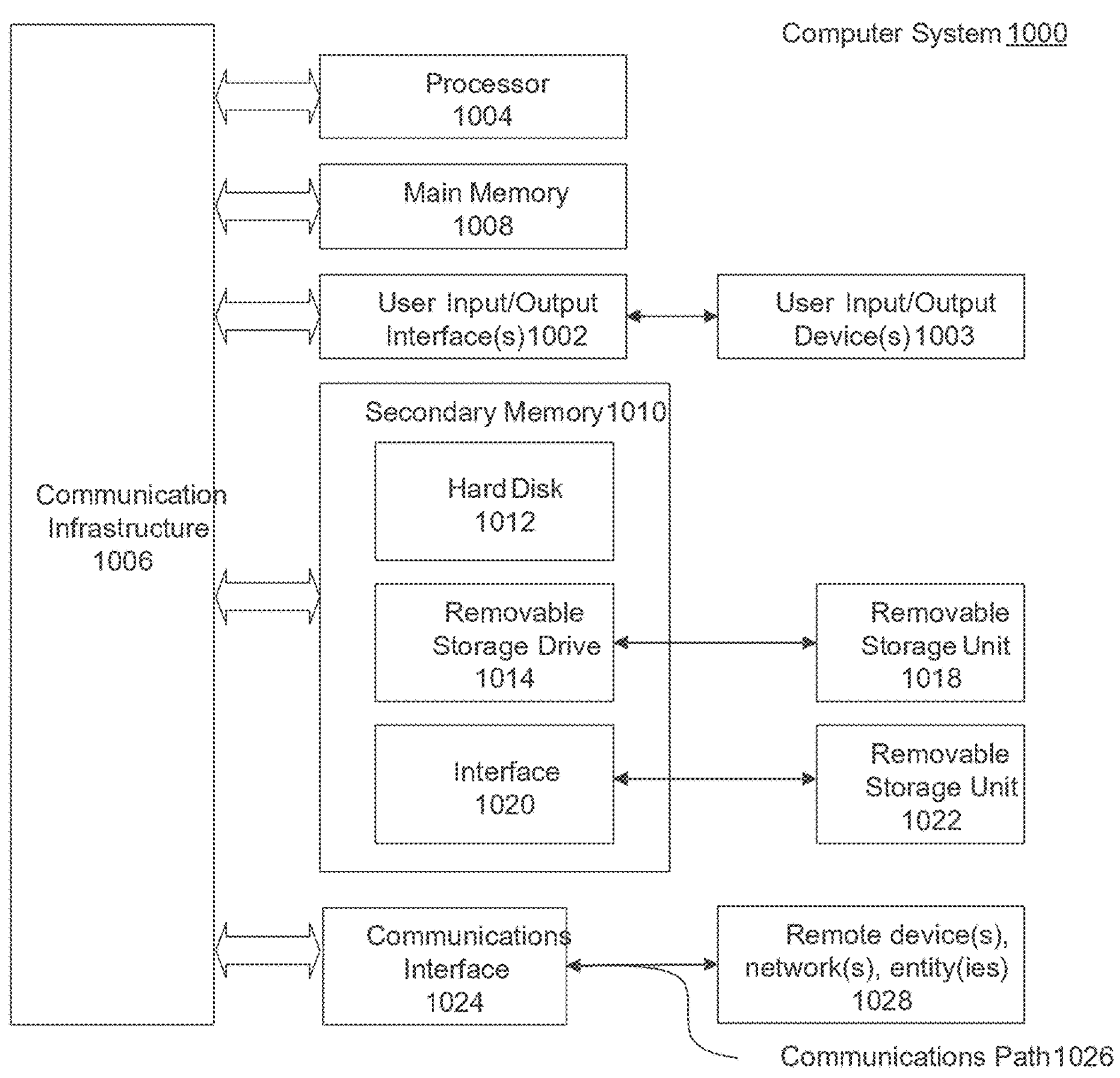
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for adaptive bitrate selection, comprising:

receiving, by at least one computer processor, a data streaming request;

predicting, by a speed predictive machine learning model and based on one or more streaming parameters, a current sustainable network bandwidth, wherein the speed predictive machine learning model is trained using a training data set comprising a history of the one or more streaming parameters;

predicting, by a rebuffer predictive machine learning model and based on the current sustainable network bandwidth, a buffer level of a data buffer, and N available discrete bitrates, a candidate bitrate at which a likelihood of rebuffering of the data buffer occurs less than a threshold percentage;

selecting, based on the candidate bitrate, a download bitrate to complete the data streaming request; and downloading streaming data at the download bitrate.

2. The computer-implemented method of claim 1, wherein the predicting the candidate bitrate further comprises:

predicting, by the rebuffer predictive machine learning model and based further on a chunk duration, the candidate bitrate at which the likelihood of rebuffering of the data buffer occurs less than the threshold percentage.

3. The computer-implemented method of claim 2, wherein the predicting the candidate bitrate further comprises:

selecting the current sustainable network bandwidth as a first instance of the candidate bitrate.

4. The computer-implemented method of claim 3, wherein the predicting the candidate bitrate further comprises:

predicting that the first instance of the candidate bitrate would produce the rebuffering of the data buffer; and selecting, from the N available discrete bitrates, a second instance of the candidate bitrate.

5. The computer-implemented method of claim 4, wherein the selecting, from the N available discrete bitrates, the second instance of the candidate bitrate further comprises:

selecting a next lower bitrate from the N available discrete bitrates.

6. The computer-implemented method of claim 1, further comprising:

retraining the speed predictive machine learning model based on the current sustainable network bandwidth; and retraining the rebuffer predictive machine learning model based on the candidate bitrate.

7. The computer-implemented method of claim 1, further comprising:

in response to the likelihood of rebuffering of the data buffer being over a threshold percentage, selecting a next lower available bitrate until the likelihood of rebuffering of the data buffer is under the threshold percentage.

8. The computer-implemented method of claim 1, wherein the one or more streaming parameters further comprise any of:

N previous bitrates, where N represents a number of most recent bitrates in a history of previous download bitrates;

an average speed of the N previous bitrates; or a standard deviation of the N previous bitrates.

9. A system for adaptive bitrate selection, comprising:

one or more memories; and at least one processor each coupled to at least one of the memories and configured to perform operations comprising:

receiving a data streaming request;

predicting, by a speed predictive machine learning model and based on one or more of a plurality of streaming parameters, a current sustainable network bandwidth, wherein the speed predictive machine learning model is trained using a training data set comprising a history of the one or more streaming parameters;

predicting, by a rebuffer predictive machine learning model and based on the current sustainable network bandwidth, a buffer level of a data buffer, and N available discrete bitrates, a candidate bitrate at which a likelihood of rebuffering of the data buffer occurs less than a threshold percentage;

selecting, based on the candidate bitrate, a download bitrate to complete the streaming request; and downloading streaming data at the download bitrate.

10. The system of claim 9, wherein the predicting the candidate bitrate further comprises:

predicting, by the rebuffer predictive machine learning model and based further on a chunk duration, the candidate bitrate at which the likelihood of rebuffering of the data buffer occurs less than the threshold percentage.

11. The system of claim 10, wherein the predicting the candidate bitrate further comprises:

selecting the current sustainable network bandwidth as a first instance of the candidate bitrate.

12. The system of claim 11, wherein the predicting the candidate bitrate further comprises:

predicting that the first instance of the candidate bitrate would produce the rebuffering of the data buffer; and selecting, from the N available discrete bitrates, a second instance of the candidate bitrate.

13. The system of claim 12, wherein the selecting, from the N available discrete bitrates, the second instance of the candidate bitrate further comprises:

selecting a next lower bitrate from the N available discrete bitrates.

14. The system of claim 9, wherein the operations further comprise:

retraining the speed predictive machine learning model based on the current sustainable network bandwidth; and retraining the rebuffer predictive machine learning model based on the candidate bitrate.

15. The system of claim 9, wherein the operations further comprise:

in response to the likelihood of rebuffering of the data buffer being over a threshold percentage, selecting a next lower available bitrate until the likelihood of rebuffering of the data buffer is under the threshold percentage.

16. The system of claim 9, wherein the one or more streaming parameters further comprise any of:

N previous bitrates, where N represents a number of most recent bitrates in a history of previous download bitrates;

an average speed of the N previous bitrates; or a standard deviation of the N previous bitrates.

17. A non-transitory computer-readable medium having instructions stored thereon that, when executed by at least one computing device, cause the at least one computing device to perform operations comprising:

receiving a data streaming request;

predicting, by a speed predictive machine learning model and based on one or more of a plurality of streaming parameters, a current sustainable network bandwidth, wherein the speed predictive machine learning model is trained using a training data set comprising a history of the one or more streaming parameters;

predicting, by a rebuffer predictive machine learning model and based on the one or more streaming parameters, the current sustainable network bandwidth, a buffer level of a data buffer, and N available discrete bitrates, a candidate bitrate at which a likelihood of rebuffering of the data buffer occurs less than a threshold percentage;

selecting, based on the candidate bitrate, a download bitrate to complete the streaming request; and downloading streaming data at the download bitrate.

18. The non-transitory computer-readable medium of claim 17, wherein the predicting the candidate bitrate further comprises:

predicting, by the rebuffer predictive machine learning model and based further on a chunk duration, the candidate bitrate at which the likelihood of rebuffering of the data buffer occurs less than the threshold percentage.

19. The non-transitory computer-readable medium of claim 18, wherein the predicting the candidate bitrate further comprises:

selecting the current sustainable network bandwidth as a first instance of the candidate bitrate.

20. The non-transitory computer-readable medium of claim 19, wherein the predicting the candidate bitrate further comprises:

predicting that the first instance of the candidate bitrate would produce the rebuffering of the data buffer; and selecting, from the N available discrete bitrates, a second instance of the candidate bitrate.

* * * * *